April 2, 1957  W. G. NEILD  2,787,752
ELECTRICAL SYSTEM
Filed July 1, 1955
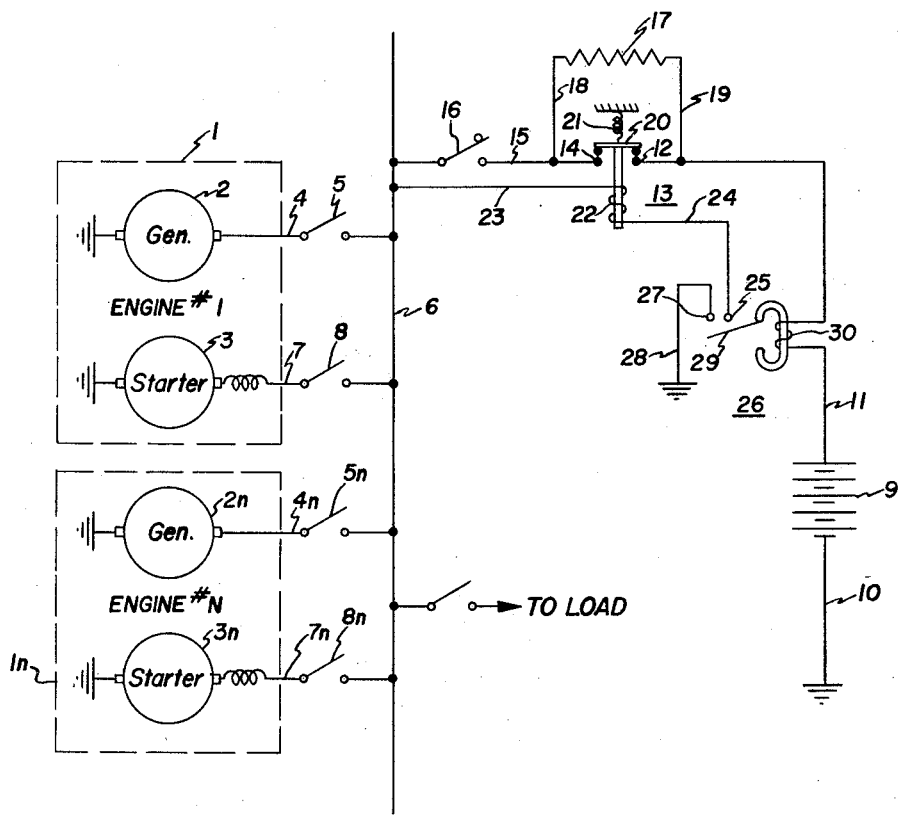
INVENTOR.
WILLIAM G. NEILD
BY
ATTORNEY

United States Patent Office 2,787,752
Patented Apr. 2, 1957

2,787,752
ELECTRICAL SYSTEM

William G. Neild, Fair Haven, N. J., assignor to Bendix Aviation Corporation, Eatontown, N. J., a corporation of Delaware Application July 1, 1955, Serial No. 519,584

1 Claim. (Cl. 320—5)

The present invention relates to electrical systems and more particularly to a system for limiting the rate of current flow in one direction and permitting unlimited current flow in the opposite direction.

Aircraft engines have reached such a size that it is not practical to supply enough power from a conventional lead-acid storage battery to start them. A lead-acid battery, having sufficient capacity for starting, would be of a size and weight to make it impractical for such use.

It has been found that a pure chemical battery, such for example as a silver-zinc or nickel-cadmium battery, has considerable more capacity than a lead-acid battery of the same size and weight. Further, the characteristics are such that the internal resistance is very low, hence its terminal voltage remains high even after relatively long periods of discharge at high current. Likewise, when discharged, the internal resistance is low and the rate of charge in this condition would be excessive thus possibly causing damage to the battery or even overloading the aircraft electrical system.

The present invention provides means for limiting the rate of charge without limiting the rate of discharge. Upon the rate of charge exceeding a predetermined amount, a suitable resistance is connected in series between the battery and the source of charging current.

It is an object of the present invention to provide a novel electrical system.

Another object of the invention is to provide novel means for limiting the rate of charge of a battery without limiting the rate of discharge.

Another object of the invention is to provide a novel electrical system which limits the current flow in one direction without limiting the current flow in the opposite direction.

The above and other objects and features of the invention will appear more fully hereinafter from a consideration of the following description taken in connection with the accompanying drawing wherein one embodiment of the invention is illustrated by way of example.

In the drawing the single figure is a schematic diagram of a system embodying the invention.

Referring now to the drawing wherein a simplified schematic diagram of an aircraft electrical system is illustrated. It is understod that other equipment will be used in the system, however, as it is not a part of the present invention, it has been omitted for simplicity.

Aircraft engines are indicated diagrammatically by the dashed boxes 1 and 1n as having respective generators 2 and 2n, and starter motors 3 and 3n. While only two engines are illustrated, it is understood that it is not limited thereby but may be one or more. The generators 2 and 2n are connected by conductors 4 and 4n through switches 5 and 5n to a main bus 6. In like manner, the starters 3 and 3n are connected by respective conductors 7 and 7n through switches 8 and 8n to the main bus 6.

A battery 9 has one terminal connected by conductor 10 to ground. The other terminal of the battery 9 is connected by a conductor 11 to a contact 12 of a relay 13. Contact 14 of the relay 13 is connected by a conductor 15 through a switch 16 to the main bus 6. A resistor 17 is connected across the contacts 12 and 14 by conductors 18 and 19. The relay 13 has a switch member 20, adapted to coact with the contacts 12 and 13, biased towards an open circuit position by a spring 21. A control winding 22 of the relay 13 is adapted, when energized, to overcome the bias of the spring 21 and move the switch member 20 into engagement with the contacts 12 and 14.

One end of the winding 22 is connected by conductor 23 to the main bus 6 while the other end of the winding 22 is connected by a conductor 24 to a contact 25 of a polarized relay 26. Contact 27 of the relay 26 is connected by a conductor 28 to ground. A switch member 29 is adapted to coact with the contacts 25 and 27 and when in a normal position engages the contacts 25 and 27. A biasing winding 30 of the relay 26 is connected in series with the conductor 11. The relay 26 is poled so that when current is flowing from the battery 9, the switch member 29 will be in engagement with the contacts 25 and 27.

In operation, when the battery 9 is connected to the bus 6 through the switch 16, current will flow through the winding 22 of the relay 13 through the normally closed contacts 25 and 27 of the relay 26 to ground. The pull of the winding 22 overcomes the bias of the spring 21 and the switch member 20 is actuated into engagement with the contacts 12 and 14 thereby shorting out the resistor 17. When in the aforenoted condition, the resistor 17 is shunted and the rate of discharge of the battery 9 is not limited.

Upon the flow of current towards the battery, the charging rate, exceeding a predetermined value, the winding 30 will bias the relay 26 so that the switch member 29 is moved from engagement with the contacts 25 and 27 thereby deenergizing the winding 22 of the relay 13. Upon the winding 22 being deenergized, the switch member 20 is moved from engagement with the contacts 12 and 14, thereby inserting the resistor 17 in series with the battery 9. The resistor 17 is of a value to limit the charging current to a safe maximum. Upon the charging current falling below the predetermined value, the relay 26 will actuate the switch member 29 into engagement with the contacts 25 and 27 thereby energizing the winding 22 of the relay 13 and shunt the resistor 17. Thus a system is provided that will limit the current flow in one direction yet provide unlimited flow in the opposite direction.

Although only one embodiment of the invention has been illustrated and described, various changes in the form and relative arrangement of the parts, which will now appear to those skilled in the art, may be made without departing from the scope of the invention.

What is claimed is:

In an electrical system for use with a storage battery, comprising a source of energy, a storage battery, circuit means including a relay and a resistor connected in parallel connecting said source of energy and said battery, said relay being biased to an open circuit position, a control winding for actuating said relay to a closed circuit position when energized, means including a polarized relay for controlling the energization of said control winding, said polarized relay being responsive to current flowing towards said battery exceeding a predetermined amount to deenergize said control winding.

References Cited in the file of this patent

UNITED STATES PATENTS

| 374,673 | Griscom | Dec. 13, 1887 |
| 1,227,771 | Foote | May 29, 1917 |

FOREIGN PATENTS

| 376,568 | Great Britain | May 4, 1932 |
| 400,246 | Great Britain | Oct. 18, 1933 |